US006669167B2

(12) United States Patent
Lin

(10) Patent No.: US 6,669,167 B2
(45) Date of Patent: Dec. 30, 2003

(54) STRUCTURE OF A LPG TANK VALVE

(76) Inventor: Richard Lin, PO Box 82-144, Taipei (TW)

( * ) Notice: Subject to any disclaimer, the term of this patent is extended or adjusted under 35 U.S.C. 154(b) by 0 days.

(21) Appl. No.: 10/092,584

(22) Filed: Mar. 8, 2002

(65) Prior Publication Data

US 2003/0168621 A1 Sep. 11, 2003

(51) Int. Cl.[7] .................................................. F16K 31/50
(52) U.S. Cl. ............................ 251/144; 251/77; 126/38
(58) Field of Search ................................ 251/144, 148, 251/149.1, 149.4, 149.6, 264, 77; 126/52, 42, 38, 39 R

(56) References Cited

U.S. PATENT DOCUMENTS 3,701,363 A * 10/1972 Schuler et al. ......... 137/601.16
3,749,356 A * 7/1973 Conley ....................... 251/148
3,907,490 A * 9/1975 Schaller ..................... 126/38 X
3,924,654 A * 12/1975 Buller et al. ......... 251/149.4 X
4,082,993 A * 4/1978 Oakes ....................... 126/40 X
4,128,391 A * 12/1978 Braunstein ........... 251/149.1 X
4,667,694 A * 5/1987 Dalton ....................... 137/154
5,016,611 A * 5/1991 Lai ............................. 126/52
5,027,871 A * 7/1991 Guenther ................ 141/198 X
5,584,467 A * 12/1996 Harnett et al. ......... 251/129.07
5,868,126 A * 2/1999 Long et al. ................... 126/38
5,911,403 A * 6/1999 deCler et al. ............ 251/149.6
5,937,895 A * 8/1999 Le Febre et al. ........... 137/494

* cited by examiner

*Primary Examiner*—Paul J. Hirsch
*Assistant Examiner*—Eric Keasel
(74) *Attorney, Agent, or Firm*—Leong C. Lei

(57) ABSTRACT

An improved structure of a LPG tank valve having a threaded connector mounted onto a LPG tank and a rotating button being provided to one end of the threaded connector, and an urging device being provided to the threaded connector, and the bottom end of the rotating button aligned with the urging device being provided with an urging rod, the urging device includes a tube body, an urging rod and a spring, and one end of the tube body is vertically locked to the threaded connector, via the connector and the space of the valve, the tube body is provided with the urging rod, and the rod head of the urging rod is higher than the tube body and is protruded into the mouth of the LPG tank valve, and the lower end of the rod head is connected in series with a spring urged the wall of the tube body, and a gap is formed between the rod body of the urging rod and the wall of the tube body and when the valve is mounted onto the tank, the bottom end of the tube body does not urge against the needle valve of the tank and only when the rotating button is depressed, the press down pushes the urging rod and the needle valve is forced to open and the liquefied gas is released.

1 Claim, 4 Drawing Sheets

STRUCTURE OF A LPG TANK VALVE

BACKGROUND OF THE INVENTION (a) Technical Field of the Invention

The present invention relates to an improved structure of a LPG tank valve, and in particular, an urging device within the valve of a LPG tank.

(b) Description of the Prior Art

FIG. 1 is a perspective view of a conventional LPG tank valve and a LPG tank. The valve 20 is connected to a stove 30 via a connection tube (not shown). The bottom end of the valve 20 is provided with a threaded connector 211 for mounting with the threaded head 11 of the LPG tank 10. The needle valve 12 within the threaded head 11 is in engagement with an urging device 23 within the threaded connector 21. FIG. 2 is a sectional view showing the valve of LPG tank in a closed position. The bottom end of the rotating button 22 in aligned with the urging device 23 is provided with a press rod 24, and the urging device 23 comprises a tube body 25 and a needle valve 26. One end of the tube body 25 is vertically locked to the threaded connector 21, and the needle valve 26 is mounted at the mouth of the threaded connector 21 to the vale 20 such that one end of the needle valve 26 protruded out of the threaded connector 21 is located below the rod 24. When the valve 20 is connected to the LPG tank 10, the tube body 25 forces open the needle valve 12 within the mouth 11 of he tank, at this instance, LPG fills out the space of the tube body 25. If the rotating button 22 has not been rotated, the press rod 24 will not press the needle valve 26, the valve 26 blocks LPG from escaping. When LPG is required, as shown in FIG. 3, the rotating button 22 is rotated downward to press down the rod 24 and the needle valve 26 is opened, the LPG via the inner chamber of the LPG valve 20, from the outlet tube 27 of the valve, flows to the burner 30. The conventional structure has the following drawbacks:

(1) After a period of use of the LPG tank valve, the inlet of the needle valve is accumulated with carbon residue, and dust, and the valve may not be restored to its closed position, and this may cause a LPG leakage or cause explosion to the burner.

(2) The needle valve on the LPG tank is not required as leakage from a LPG tank can be detected in the LPG supplier. Therefore, it is a waste of cost in manufacturing and increases the cost of material. Accordingly, it is an object of the present invention to provide an improved structure of a LPG tank valve which mitigates the above drawbacks.

SUMMARY OF THE INVENTION

Accordingly, it is an object of the present invention to provide an improved structure of a LPG tank valve having a threaded connector mounted onto a LPG tank and a rotating button being provided to one end of the threaded connector, and an urging device being provided to the threaded connector, and the bottom end of the rotating button aligned with the urging device being provided with an urging rod, characterized in that the urging device includes a tube body, an urging rod and a spring, and one end of the tube body is vertically locked to the threaded connector, via the connector and the space of the valve, the tube body is provided with the urging rod, and the rod head of the urging rod is higher than the tube body and is protruded into the mouth of the LPG tank valve, and the lower end of the rod head is connected in series with a spring urged the wall of the tube body, and a gap is formed between the rod body of the urging rod and the wall of the tube body and when the valve is mounted onto the tank the bottom end of the tube body does not urge against the needle valve of the tank and only when the rotating button is depressed, the press down pushes the urging rod and the needle valve is forced to pen and the liquefied gas is released.

Yet another object of the present invention is to provide an improved structure of a LPG tank valve, wherein the accumulated carbon or dust will not be formed at the needle valve.

Other objects, and advantages of the present invention will become more apparent from the following description taken in conjunction with the accompanying drawing.

DETAILED DESCRIPTION OF THE PREFERRED EMBODIMENT

Figure 1:
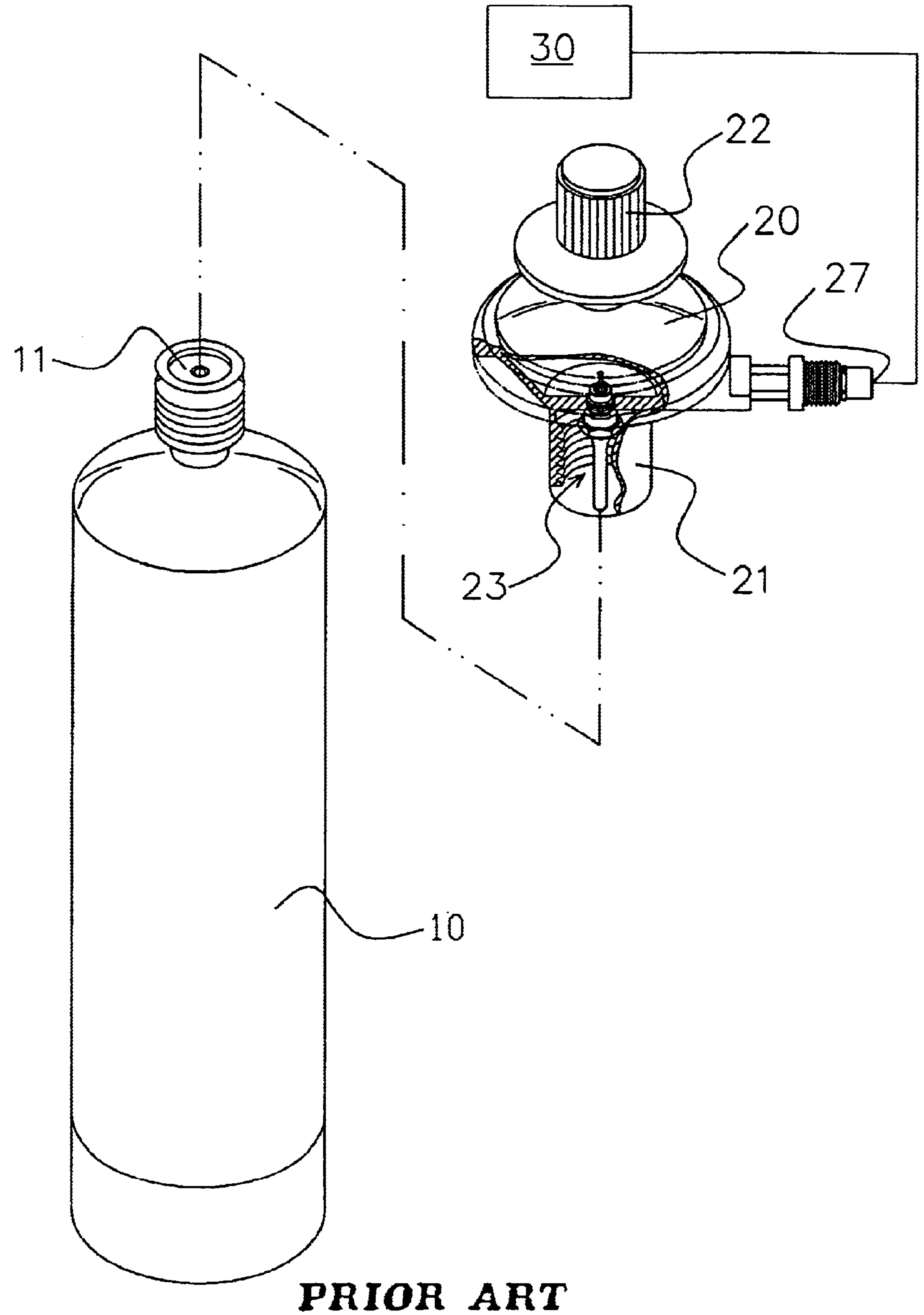
PRIOR ART FIG. 1
FIG. 1 is a perspective view of a conventional LPG tank valve and a LPG tank.
Figure 2:
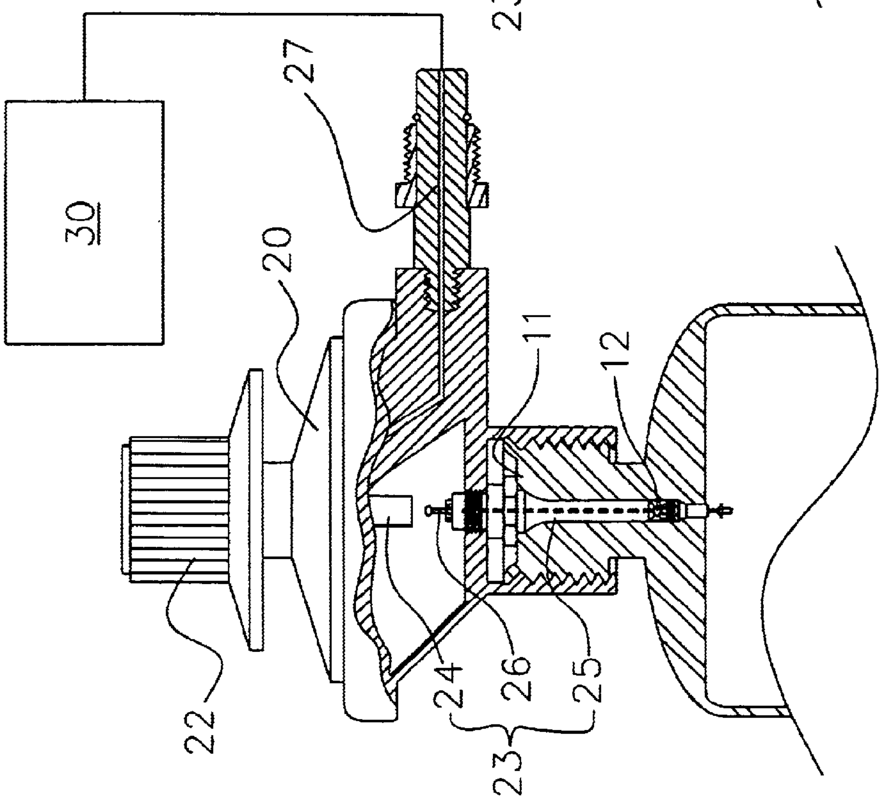
PRIOR ART FIG. 2
FIG. 2 is a sectional view showing the conventional LPG tank valve prior to the opening of the valve.
Figure 3:
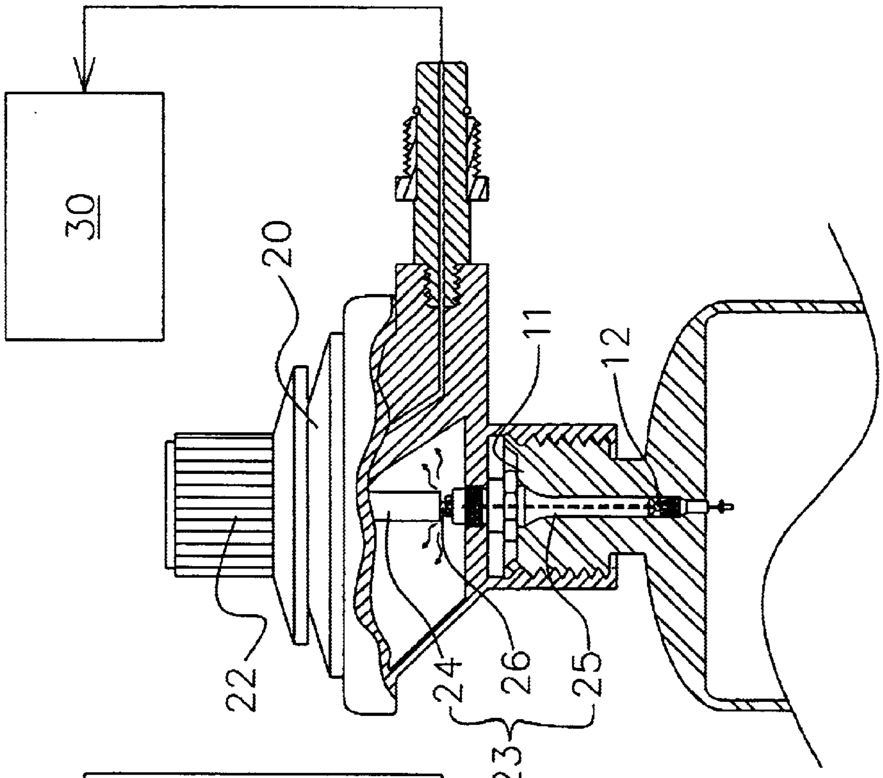
PRIOR ART FIG. 3
FIG. 3 is a sectional view showing the conventional LPG tank valve in the course of opening of the valve.

FIG. 1 is a perspective view of a conventional LPG tank valve and a LPG tank. FIG. 2 is a sectional view showing the conventional LPG tank valve prior to the opening of the valve. FIG. 3 is a sectional view showing the conventional LPG tank valve in the course of opening of the valve.

Figure 4:
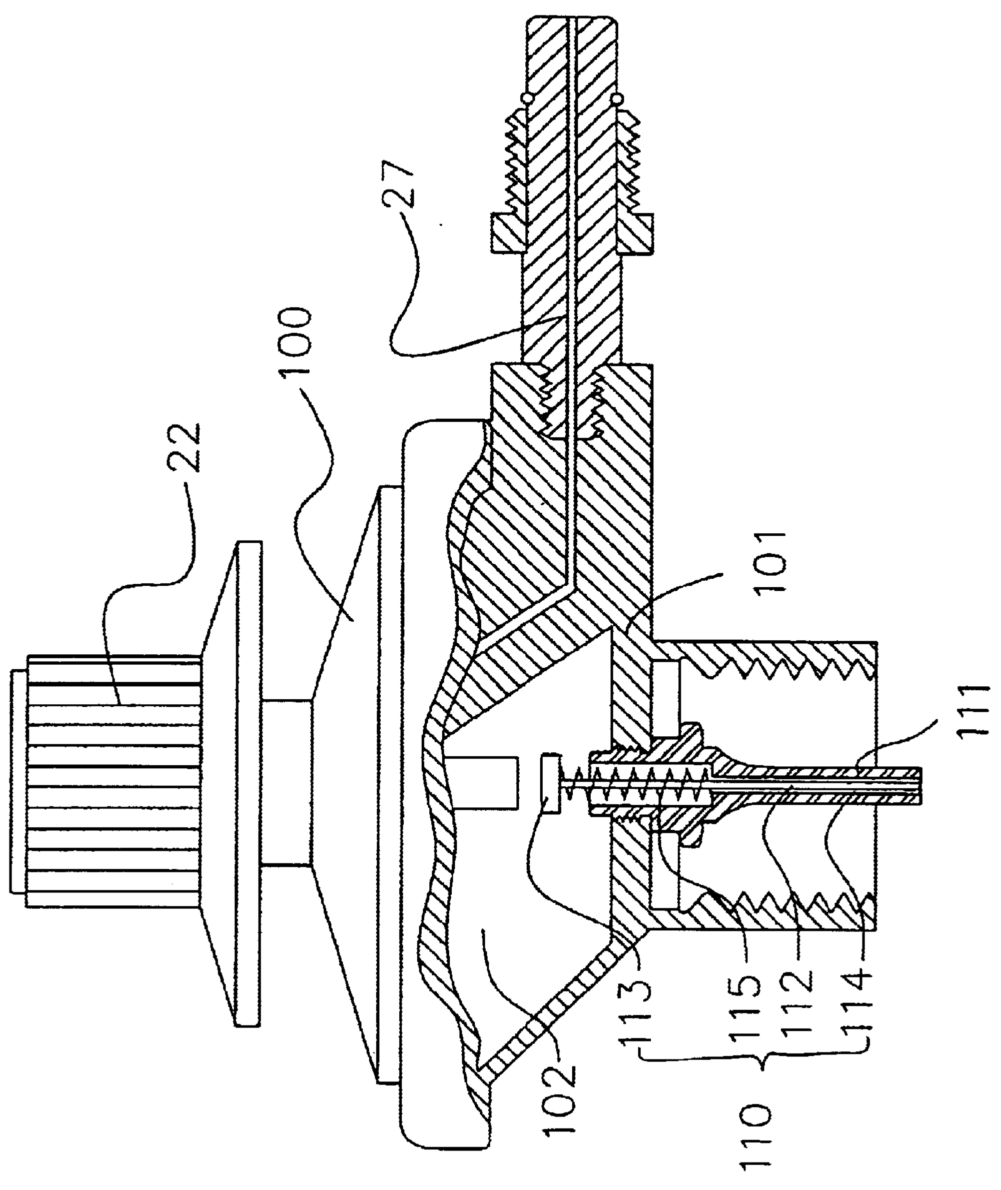
FIG. 4 is a sectional view showing the improved structure of the LPG tank valve in accordance with the present invention.

FIG. 4 is a perspective view showing the LPG tank valve in accordance with the present invention. In accordance with the present invention, the urging device 110 is positioned within the LPG tank valve 100 and comprises a tube body 111, an urging rod 112 and a spring 115. One end of the tube body 111 is vertically locked to the threaded connector 101 of the valve 100 and passes through the space 102 of the valve 100. The urging rod 112 is inserted into the tube body 111 and the rod head 113 of the urging rod 112 is higher than the mouth of the tube body 111 and is protruded into the valve 100. The bottom end of the rod head 113 connected in series with the spring 115 urges the wall of the tube body 111, and a gap 114 is formed between the urging rod 112 and the tube body 111.

Figure 5:
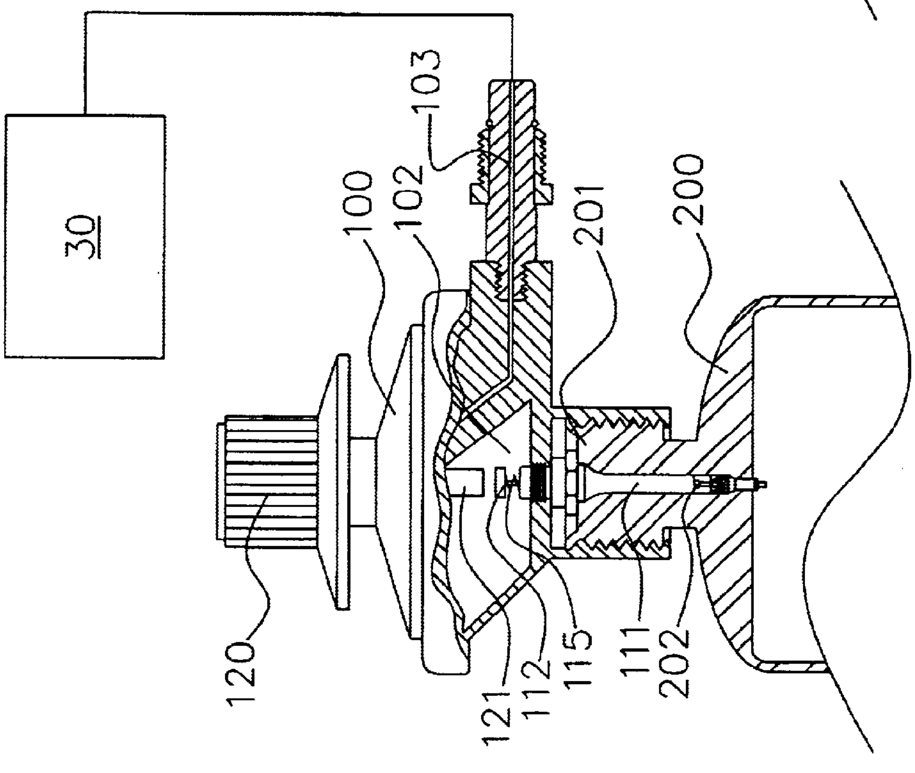
FIG. 5 is a sectional view showing the LPG tank valve prior to the opening of the valve in accordance with the present invention.
Figure 6:
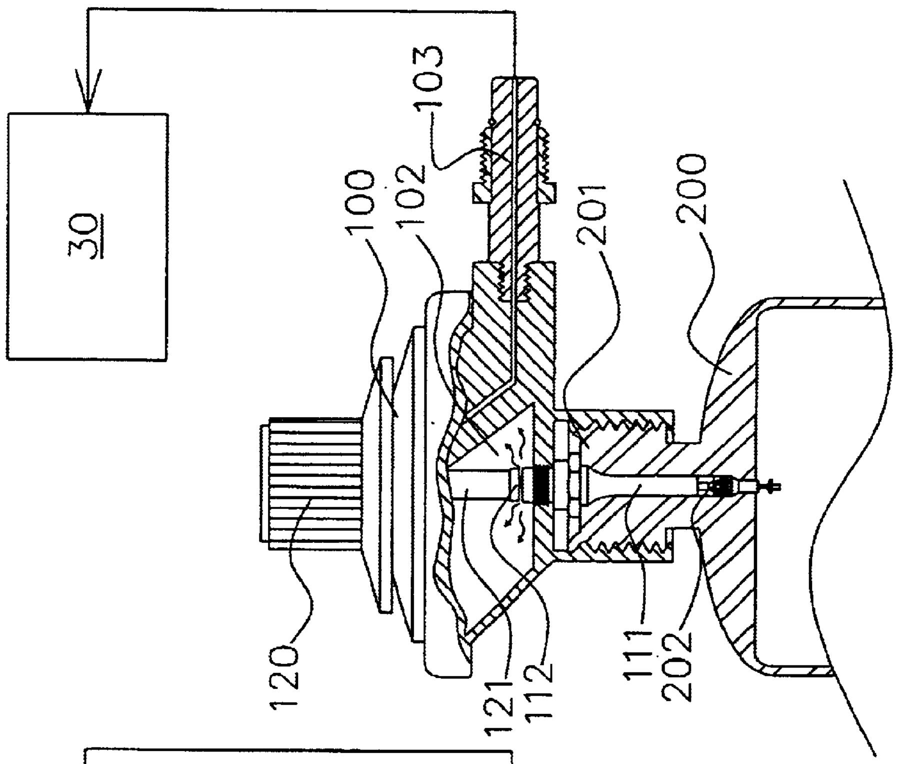
FIG. 6 is a sectional view showing the LPG tank valve in the course of opening of the valve in accordance with the present invention.

FIG. 5 is a sectional view showing the LPG tank valve prior to the opening of the valve in accordance with the present invention. When the valve 100 is mounted onto a LPG tank 200, the bottom end of the tube body 111 does not press onto the needle valve 202 of the mouth 201 of the tank and the spring force of the spring 115 pushes up the urging rod 112. At this instance, the liquefied gas within the tank 200 is similar to that in a tank without the valve 100. As the needle valve 202 seals the tank 200 and the liquefied gas will not release from the tank 200. As shown in FIG. 6, when the gas is to be released, the rotating button 120 of the valve 100 is rotated downward and the button 120 is protruded to the press rod 121 of the valve 100 to push down the rod head 113, and the spring force of the spring 115 is overcome. This will cause the urging rod 112 to press open the needle valve 202 of the mouth of the tank 201 to release the liquefied gas within the tank 200. The gas will flow from the gap 114 to the space 102 of the valve 100 via the outlet tube 103 of the valve 100 to the burner 30.

In view of the above, the LPG tank valve 100 does not need to install a conventional needle valve 26 but employs the needle valve 202 at the mouth 201 of the tank to achieve the transporting of liquefied gas and to prevent liquefied leakage. In accordance with the present invention, the reciprocating of the rod body of the urging rod 112 within the tube body 111 will clear away the accumulated carbon or dust at the gap 114 and the gap will not be blocked.

While the invention has been described with respect to preferred embodiments, it will be clear to those skilled in the art that modifications and improvements may be made to the invention without departing from the spirit and scope of the invention. Therefore, the invention is not to be limited by the specific illustrative embodiment, but only by the scope of the appended claims.

I claim:

1. An improved structure of a LPG tank valve having a threaded connector mounted onto a LPG tank and a rotating button being provided to one end of the threaded connector, and an urging device being provided to the threaded connector, and the bottom end of the rotating button aligned with the urging device being provided with an urging rod, characterized in that the urging device includes a tube body, an urging rod and a spring, and one end of the tube body is vertically locked to the threaded connector, via the connector and the space of the valve, the tube body is provided with the urging rod, and the rod head of the urging rod is higher than the tube body and is protruded into the mouth of the LPG tank valve, and the lower end of the rod head is connected in series with a spring urged the wall of the tube body, and a gap is formed between the rod body of the urging rod and the wall of the tube body and when the valve is mounted onto the tank, the bottom end of the tube body does not urge against the needle valve of the tank and only when the rotating button is depressed, the press down pushes the urging rod and the needle valve is forced to open and the liquefied gas is released.

* * * * *